Dec. 2, 1952
E. L. C. WHITE
CIRCUITS FOR THE GENERATION OF ELECTRICAL VARIATIONS
Filed Feb. 3, 1948
2,620,456
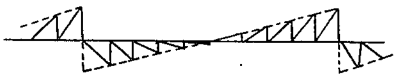
Fig. 1a.
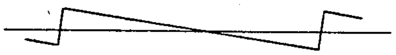
Fig. 1b.
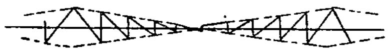
Fig. 1c.
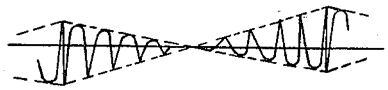
Fig. 1d.
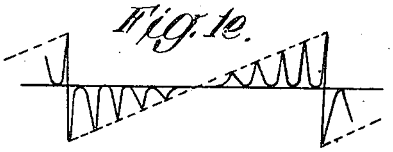
Fig. 1e.
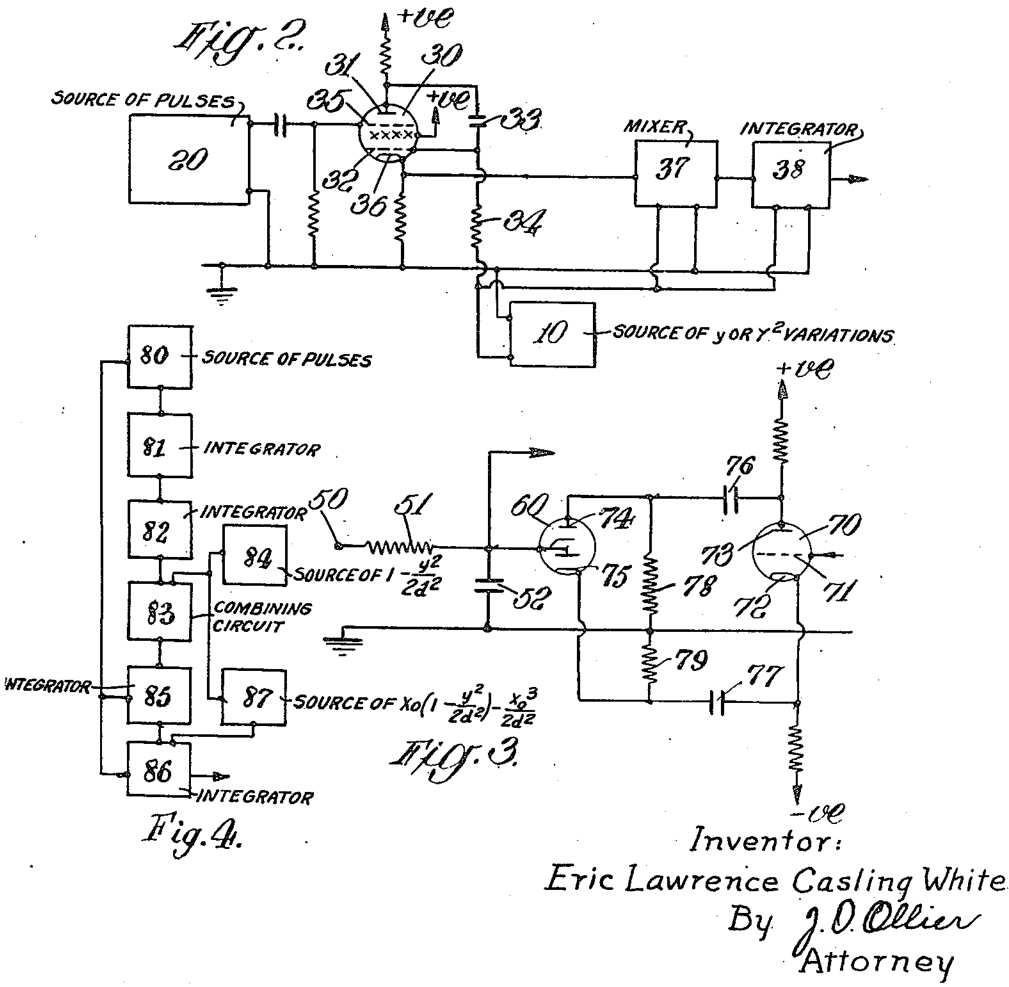
Fig. 2. Fig. 3.
Fig. 4.
Inventor:
Eric Lawrence Casling White
By J. O. Ollier
Attorney Patented Dec. 2, 1952

2,620,456

UNITED STATES PATENT OFFICE 2,620,456

CIRCUITS FOR THE GENERATION OF ELECTRICAL VARIATIONS

Eric Lawrence Casling White, Iver, England, assignor to Electric & Musical Industries Limited, Hayes, England, a company of Great Britain Application February 3, 1948, Serial No. 6,053
In Great Britain February 4, 1947

6 Claims. (Cl. 315—24)

The present invention relates to circuits for the generation of electrical variations and has particular but not exclusive application to the correction of "pin-cushion" or "barrel" distortion which occurs during scanning of a target electrode in cathode ray tubes used, for example, in television apparatus.

It is known that to obtain a good focus for all deflection angles of the electron beam of a cathode ray tube of the magnetically deflected type it is necessary to use uniform deflecting fields. In this case since the length of the path of an electron in the deflecting field increases with increasing deviation from the undeflected path the deflection angle of the beam is not strictly proportional to the current in the deflecting coils. This tends to cause pin-cushion distortion. Moreover, when as is often required the electron beam falls on a plane target electrode it is known that this is also a factor tending to cause pin-cushion distortion. Barrel distortion sometimes occurs as a result of incorrect curvature of the scanned area with respect to the point about which the beam is deflected.

Various expedients have heretofore been proposed for correcting such pin-cushion or barrel distortion but such proposals have usually entailed the use of magnetic fields auxiliary to the deflecting means or the use of inhomogeneous deflecting fields.

One of the objects of the present invention is to provide a circuit arrangement embodying a cathode ray tube in which either pin-cushion or barrel distortion is substantially reduced or eliminated in an improved manner.

According to one feature of the invention there is provided a circuit arrangement embodying a cathode ray tube, beam deflecting means for scanning the beam of said tube over a target area and means for applying to said beam deflecting means scanning waveforms which are such that either pin-cushion or barrel distortion which would otherwise occur in said area is substantially reduced or eliminated.

According to another feature of the invention there is provided a circuit arrangement embodying a cathode ray tube, beam deflecting means for scanning the beam of said tube over a target area and means for applying to said beam deflecting means scanning waveforms which are similarly modified in accordance with the radial amplitude of displacement of the spot formed by said beam on said target area so that pin-cushion or barrel distortion which would otherwise occur is substantially reduced or eliminated.

It will be shown hereinafter that in order to obtain the desired correction for either pin-cushion or barrel distortion a linear scanning waveform is required to be modified by a factor $(1+Ar^2)$ and according therefore to a further feature of the invention there is provided a circuit arrangement embodying a cathode ray tube, beam deflecting means for scanning the beam of said tube over a target area, means for applying to said beam deflecting means linear scanning waveforms which are modified by a factor $(1+Ar^2)$ where $r$ is the radial amplitude of displacement of the spot formed by said beam on the target area and A is a constant so that pin-cushion or barrel distortion which would otherwise occur in said area is substantially reduced or eliminated.

Another object of the present invention is to provide an improved circuit arrangement from which scanning waveforms can be derived suitable for correcting either pin-cushion or barrel distortion.

According therefore to a further feature of the invention there is provided a circuit arrangement embodying a cathode ray tube, beam deflecting means for scanning the beam of said tube at line and frame frequencies, means for integrating frame frequency oscillations, means for repeatedly interrupting the integration at line frequency and means for applying to said beam deflecting means line and frame frequency scanning waveforms derived from said integration process so as substantially to reduce or eliminate either pin-cushion or barrel distortion which would otherwise occur.

According to a further feature of the invention there is provided a circuit arrangement embodying a cathode ray tube, beam deflecting means for scanning the beam of said tube at line and frame frequencies and means for applying to said beam deflecting means a line frequency deflecting waveform, said waveform being generated by integrating sawtooth variations of line frequency of the form $x$ and periodically interrupting the integration at instants when $x$ is substantially zero and then causing it to recommence from the instantaneous value $$1-\frac{y^2}{2d^2}$$

this term having the significance hereinafter referred to.

According to yet a further feature of the invention there is provided a circuit arrangement for the generation of electrical variations comprising a first source of repetitive electrical variations and integrating means for integrating said variations from said first source, a second source of electrical variations and means for interrupting the integration of the variations from said first source and for causing said integration to recommence at a variable value determined by the variations from said first and second sources.

It can be shown that when a cathode ray beam of a tube falls normally upon a plane screen in its undeflected condition and is deflected on the screen a distance $x$ in one of two mutually orthogonal directions, e. g. line deflection, and a distance $y$ in the other of said two directions, e. g. frame deflection under the influence of a homogeneous magnetic deflecting field having components $H_x$, $H_y$ respectively resolved parallel with said directions, then the deflections $x$, $y$ are related very approximately to the field components $H_x$, $H_y$ by the equations:

$$kH_y=\frac{x}{d}\left(1-\frac{x^2+y^2}{2d^2}\right) \quad (1)$$

$$kH_x=\frac{y}{d}\left(1-\frac{x^2+y^2}{2d^2}\right) \quad (2)$$

where $d$ is the distance of the screen from the point of deflection and $k$ is a factor depending on the charge to mass ratio of an electron and the working conditions and arrangement of the tube.

It will be seen that deflections $x$ and $y$ are not achieved by component magnetic deflecting forces proportional simply to $y$ and $x$ respectively but by these components multiplied by a factor of the form $$1+Ar^2$$

where $$r^2=x^2+y^2$$

so that $r$ is the radial amplitude of spot deflection and A is a constant.

Pin-cushion distortion would result if the beam were deflected by forces proportional to $x$ and $y$ but such distortion can be overcome by modifying the deflecting waveform by the factor $1+ar^2$. In the case of barrel distortion the latter can be overcome by modifying the deflecting waveforms by a factor of the same form, the sign of the constant A determining the type of correction required.

In order that the said invention may be clearly understood and readily carried into effect it will now be more fully described with reference to the accompanying drawings in which:

Figures 1($a$), 1($b$), 1($c$), 1($d$) and 1($e$) are explanatory diagrams,

Figure 2 illustrates a circuit for carrying the invention into effect,

Figure 3 shows a modification of the circuit shown in Figure 2, and

Figure 4 is a block diagram of a circuit arrangement according to a further form of the invention.

The invention will now be described as applied to the correction of pin-cushion distortion. In order to generate scanning waveforms in accordance with Equations 1 and 2 above for deflecting the cathode ray beam of a cathode ray tube at line and frame frequencies, it is necessary to generate product terms of $xy^2$ and $x^2y$ and to generate an $x^3$ and $y^3$ term, the $xy^2$ term and the $x^3$ term being then added to an $x$ term which is a sawtooth variation at line frequency so as to generate a corrected line frequency scanning waveform and to add the $x^2y$ term and the $y^3$ term to a $y$ term which is a sawtooth variation at frame frequency so as to generate a corrected frame frequency scanning waveform.

In order to generate the $x^2y$ term the product $xy$ is first generated. In order to generate the product $xy$ which is the variation shown in Figure 1$c$, two operations are performed. In Figure 1$b$ of the drawings there is illustrated the sawtooth variation $y$ which occurs at frame scanning frequency and in the first operation this variation $y$ is integrated by suitable means and the integration is periodically interrupted at line repetition frequency, i. e., at the frequency of the line frequency sawtooth variation $x$ and is returned to zero and the integration then recommenced so as to generate a variation of the form shown in Figure 1$a$. In the second operation, there is added to the variation shown in Figure 1$a$ a variation of the form of $y$, the result of the two operations being to produce a variation as shown in Figure 1$c$ which is the product term $xy$. In order to generate the term $x^2y$ the variation $xy$ is integrated so as to generate the variation shown in Figure 1$d$ and to this variation there is added a variation of the form $y$ so that the required term $x^2y$ for correcting the frame frequency waveform is thus generated as illustrated in Figure 1$e$.

The term $xy^2$ which is required for the line deflection correction may be generated in a manner similar to that described above for the generation of the variation $xy$ but in which a variation $y^2$ is substituted for the variation $y$, such variation $y^2$ being generated by integration of a variation $y$ in known manner.

The variations $x^2y$ and $xy^2$ are then added respectively to variations of the form of $y^3$ and $x^3$ and variations $y$ and $x$ so as to generate corrected waveforms for deflecting the cathode ray beam at frame and line frequencies respectively, the deflection being such that pin-cushion distortion is substantially reduced so that the beam scans a substantially rectangular raster.

Figure 2 of the drawings illustrates a circuit for generating the variations referred to above. In this figure the rectangle 10 represents a source of $y$ variations or a source of $y^2$ variations and rectangle 20 indicates a source of repetitive variations at the repetition rate $x$ of which the integration process is to be integrated. The variations generated by the source 20 are preferably short duration potential pulses at line frequency and of negative sense. Valve 30 which is a valve of the pentode type is so connected that it enables the integration of the variations generated by source 10 to be effected and to be interrupted with the occurrence of each pulse generated by the source 20.

Said integration is performed by the valve 30 in known manner. Thus variations of potential set up at the anode 31 of valve 30 are fed back in negative sense to the control electrode 32 of the valve through the coupling capacity 33 so that the circuit presents at the control electrode 32 a low impedance for example of the order of the reciprocal of the mutual conductance associated with said control electrode. The source 10 is connected with said control electrode through resistance 34 of magnitude large compared with said low impedance. In these circumstances potential variations which are the integral of the variations of potential difference set up between the output terminals of source 10 are established at the anode 31 of valve 30. This integration is interrupted and returned to zero by applying the negative pulse of potential generated by source 20 to the suppressor electrode 35 of valve 30 so as to render said valve non-conducting with the arrival of each of said pulses. The variations set up at the anode 31 of valve 30 or their inverted replica set up at the cathode 36 of valve 30 are applied to mixing means for mixing with the variations from source 10 so that the required variations are finally set up. The circuit shown in Figure 2 can thus be employed to generate a variation of form $xy$ and in the case where the circuit is used for generating a correcting term for frame frequency deflection the output from the mixing means 37 is applied to a further integrator 38 to which is also fed a variation of the form $y$ so that the term $x^2y$ is set up. Where the circuit shown in Figure 2 is employed for generating the $xy^2$ term, then the source 10 is arranged to generate variations of the form $y^2$ and the further integrator 38 is omitted.

The variations $x^3$ and $y^3$ are generated by twice integrating variations of the forms $x$ and $y$ in known manner and these variations, together with variations of the forms $x$ and $y$ are then added to the variations $xy^2$ and $x^2y$ to produce corrected deflecting waveforms according to Equations 1 and 2 above.

In a modified form of circuit the variations whose integration is to be interrupted are applied through a resistance to a capacity which becomes charged to a degree sufficiently accurately representative of the integral of said variations and said capacity is periodically discharged by bi-directionally switching means which interrupts the integration and returns it to zero under the control of repetition pulses so that required variations are generated.

Figure 3 illustrates by way of example such a modified form of circuit. The variations of potential to be integrated i. e., from source 10 referred to above are applied to terminal 50 and resistance 51 and capacity 52 constitute a well known form of integrating circuit. In this circuit the integral of the applied variations appears as a difference of potential between the plates of capacity 52. The double-diode valve 60 is a bi-directional switching device for discharging capacity 52 substantially to zero irrespective of its sense of charge. Said double-diode valve is controlled by the repetition pulses from source 20 referred to above which are applied to the control electrode 71 of valve 70. This valve is connected to repeat said pulses at its cathode 72 and to repeat said pulses inverted at its anode 73. The repeated pulses of both senses are applied respectively to the anode 74 and cathode 75 of the double-diode valve 60 through the coupling condensers 76 and 77 and resistances 78 and 79. Thus, whatever is the sense of charge of capacity 52 the incidence of any of said repetitive pulses at electrode 71 of valve 70 causes the discharge of capacity 52 substantially to zero thus interrupting the integration and causing it to recommence from substantially zero. The output from the condenser 52 is then modified in the manner described with reference to Figure 2.

A modification of the invention will now be described. It follows from equation (1) by differentiation with respect to time that $$D(kdH_v)=\left(1-\frac{y^2}{2d^2}-\frac{3x^2}{2d^2}\right)Dx-\frac{xy}{d2}Dy \qquad (3)$$

where D signifies the differential operator with respect to time $t$ namely $$\frac{d}{dt}$$

If, as is assumed in the derivation of Equations 1 and 2, $x$ and $y$ are normal sawtooth variations of line and frame frequencies as commonly employed in television, then Dy is very small compared with Dx. In this case Equation 3 may be reduced to:

$$D(kdH_v)=\left(1-\frac{y^2}{2d^2}-\frac{3x^2}{2d^2}\right)Dx$$

Since the scanning action in television is commonly required to be carried out at uniform velocity, that is to say such that Dx is constant, it follows that the line deflection of such scanning may be performed corrected for instance for pin-cushion distortion by means arranged to effect integration of a variation of the form $$1-\frac{y^2}{2d^2}-\frac{3x^2}{2d^2}$$

A variation of the last-mentioned form is produced by adding in suitable proportions variations of the form $x^2$ and $y^2$ together with a constant. The combination is then integrated and the integration is arranged to be interrupted at instants when $x$ is a maximum and the integration is then caused to be brought to the correct starting value of $$x_0\left(1-\frac{y^2}{2d^2}\right)-\frac{x_0^3}{2d^2}$$

where $x_0$ is the minimum value of $x$. The waveform required for deflecting the beam at frame frequency can be generated by the arrangements described with reference to Figure 2 or 3.

Figure 4 of the drawings illustrates in block form a circuit suitable for use in this modified form of the invention. As shown in this figure, the rectangle 80 represents a source of repetitive pulses occurring at line frequency which are fed to an integrator 81 which serves to generate sawtooth variations of the form $x$ referred to above. These sawtooth variations are fed to a further integrator 82 which serves to generate variations of the form $x^2$. The output from the integrator 82 is applied to an additive combining circuit 83 which is fed with variations $$1-\frac{y^2}{2d^2}$$

from a source 84. The output from the combining circuit 83 is fed to an integrator 85 and the output from the integrator 85 is fed to an interrupter 86. The integrator 85 and the interrupter 86 are controlled by pulses from the source 80 at instants when $x$ is at its maximum value so that the integrated output from the integrator 85 is caused to recommence from a value which is adjusted to the instantaneous value:

$$x_0\left(1-\frac{y^2}{2d^2}\right)-\frac{x_0^3}{2d^2}$$

which is supplied from a source 87 fed from the source 84.

The purpose of the interrupter 86 is to ensure that the integration always commences at the correct instantaneous value at the commencement of each line. For this purpose the interrupter 86 will include a bi-directionally conducting switch such as is disclosed in British Patent No. 512,109 so that after the integration process is interrupted the level from which it recommences is determined from the variations generated by the source 87. There is thus set up in the output of the interrupter 86 an output which corresponds to the integral of $$1-\frac{y^2}{2d^2}-\frac{3x^2}{2d^2}$$

which is the required line scanning waveform.

Although the invention has been described above as applied to the correction of pin-cushion distortion it will be appreciated that barrel distortion can be similarly corrected, the scanning waveforms required for correcting such barrel distortion being obtained merely by changing the signs of some of the terms referred to above.

Although the invention is mainly applicable for use in cathode ray tubes in which the beam is deflected by electromagnetic means, it will be understood that the invention is equally applicable to the generation of scanning waveforms suitable for use in the electrostatic deflection of cathode ray beams.

I claim:

1. A circuit arrangement embodying a cathode ray tube having a target area which if scanned in a uniform linear manner would exhibit either pin-cushion or barrel distortion, beam deflecting means for scanning the beam of said tube over said target area, means for generating scanning waveforms, means for modifying said waveforms in accordance with the radial amplitude of displacement of the spot formed by said beam on said target area, and means for applying said modified waveforms to said beam deflecting means to substantially reduce pin-cushion or barrel distortion.

2. A circuit arrangement embodying a cathode ray tube having a target area which if scanned in a uniform linear manner would exhibit either pin-cushion or barrel distortion, beam deflecting means for scanning the beam of said tube over said target area, means for generating linear scanning waveforms at line and frame frequencies, and means for modifying said waveforms by a factor $(1+Ar^2)$ where $r$ is the radial amplitude of displacement of the spot formed by said beam on the target area and A is a constant, and means for applying said modified waveforms to said beam deflecting means, whereby pin-cushion or barrel distortion in said area is substantially reduced or eliminated.

3. A circuit arrangement embodying a cathode ray tube having a target area which if scanned in a uniform linear manner would exhibit either pin-cushion or barrel distortion, beam deflecting means for scanning the beam of said tube over said area at line and frame frequencies, means for integrating frame frequency sawtooth oscillations, means for repeatedly interrupting the integration at line frequency, and means for applying to said beam deflecting means line and frame frequency scanning waveforms derived from said integration process substantially to reduce or eliminate either pin-cushion or barrel distortion.

4. A circuit arrangement embodying a cathode ray tube, beam deflecting means for scanning the beam of said tube at line and frame frequencies, means for applying to said beam deflecting means waveforms in accordance with the formulae $$kH_y=\frac{x}{d}\left(1-\frac{x^2+y^2}{2d^2}\right) \quad (1)$$

$$kH_x=\frac{y}{d}\left(1-\frac{x^2+y^2}{2d^2}\right) \quad (2)$$

wherein $k$ is a factor depending on the charge to mass ratio of an electron, $x$ and $y$ are deflection distances in two mutually orthogonal directions of the beam on the tube screen under the influence of a homogeneous magnetic field having components $H_x$ and $H_y$ respectively resolved parallel with said directions, and $d$ is the distance of the tube screen from the point of deflection of the beam, said means for applying the waveforms including means for integrating a variation $y^2$ and periodically interrupting said integration at the repetition frequency of the variation $x$, and means for adding thereto a variation of the form $y^2$ to generate a term $xy^2$, further means for integrating a sawtooth variation $y$, means for periodically interrupting said latter integration at the repetition frequency of the variation $x$, means for adding thereto a variation of the form $y$ to generate a product term $xy$, and means for integrating the variation $xy$ and adding thereto a variation of the form $y$ to generate the term $x^2y$ and finally means for adding said variations $xy^2$ and $x^2y$ to variations of the form $x^3$ and $y^3$ and to variations of form $x$ and $y$.

5. A circuit arrangement embodying a cathode ray tube, beam deflecting means for scanning the beam of said tube at line, and frame frequencies and means for applying to said beam deflecting means a line frequency deflecting waveform, and means for generating said waveform including means for integrating sawtooth variations of line frequency of the form $x$, means for periodically interrupting the integration at instants when $x$ is substantially a maximum, and means for restarting the integration from the instantaneous value $$x_0\left(1-\frac{y^2}{2d^2}\right)-\frac{x_0^3}{2d^2}$$

wherein $x_0$ is the minimum value of $x$ and $x$ and $y$ are deflection distances in two mutually orthogonal directions of the beam on the tube screen, and $d$ is the distance of the tube screen from the point of deflection of the beam.

6. A circuit arrangement for the generation of electrical variations, comprising a first source of repetitive electrical variations and integrating means for integrating said variations from said first source, a second source of electrical variations, and means for interrupting the integration of the variations from said first source and for restarting said integration at a variable value determined by the variations from said first and second sources.

ERIC LAWRENCE CASLING WHITE.

REFERENCES CITED

The following references are of record in the file of this patent:

UNITED STATES PATENTS

| Number | Name | Date |
|---|---|---|
| 2,183,340 | Tolson | Dec. 12, 1939 |
| 2,224,005 | Vance | Dec. 3, 1940 |
| 2,237,651 | Bruche | Apr. 8, 1941 |
| 2,305,930 | Martinelli | Dec. 22, 1942 |
| 2,313,971 | Roe | Mar. 16, 1943 |
| 2,449,524 | Witherby et al. | Sept. 14, 1948 |
| 2,463,969 | Hulst, Jr. | Mar. 8, 1949 |
| 2,464,393 | Heim | Mar. 15, 1949 |
| 2,467,834 | Lasher, Jr. | Apr. 19, 1949 |
| 2,485,594 | Hallmark | Oct. 25, 1949 |
| 2,574,946 | White | Nov. 13, 1951 |